Feb. 14, 1956 L. P. ROBINSON 2,734,692

TAPE STORAGE DEVICE

Filed Oct. 29, 1953

INVENTOR.
LELAND P. ROBINSON

BY James B. Christie

ATTORNEY

United States Patent Office 2,734,692

Patented Feb. 14, 1956

2,734,692

TAPE STORAGE DEVICE

Leland P. Robinson, Pasadena, Calif., assignor, by mesne assignments, to ElectroData Corporation, Pasadena, Calif., a corporation of California Application October 29, 1953, Serial No. 388,967

7 Claims. (Cl. 242—74)

This invention relates to apparatus for storing ribbon or tape.

Ribbon or tape, for example perforated paper tape, has been widely used for many years in Teletype and telephone systems for temporary and semi-permanent storage of coded information. Its use is now becoming widespread in many computer applications where sequences of numbered and coded instructions are stored on magnetic tape or perforated paper tape for introduction into a computer.

In the past, tape for use in computers has been stored on reels in a manner similar to that used for storage of photographic film. Such storage is not always satisfactory in computer applications because the tape often must be extracted from storage intermittently at high and low speeds. The reel introduces an undesirable amount of inertia when the tape must be accelerated or decelerated. Thus, there is a tendency for the tape to stretch or tear as the computer demands tape delivery with increasing speed, and there is a tendency for the tape to develop a "back-lash" as the computer demand for tape is decreased. In computer applications where inertia due to the reel is serious, expensive auxiliary mechanisms to accelerate and decelerate the reel in accordance with the demands of the computer must be employed.

Storage of tape on a reel has the additional disadvantage that the tape is not completely protected around its periphery.

The present invention provides apparatus in which the inertia of the storage system is minimized and which protects the periphery of a roll of tape, thus overcoming both of the foregoing disadvantages.

In accordance with my invention, the tape is wound into a roll by suitable winding means which can be removed from the wound tape after completion of the winding operation. The free tape is stored in an annular container provided with an opening in its annular wall through which the wound tape can be extracted from the container.

In a preferred form of the invention, the tape is reeled into a first ring through a slit in its peripheral wall and wound as a tight spiral. The ring is stationary and its interior peripheral surface is smooth so that as the tape is wound the first turn of the roll being formed slides easily within the ring. Means are provided for pressing the tape against the interior peripheral surface of the ring and for winding it within the ring. Preferably, this means comprises a rotatable shaft disposed on an axis transverse to the main plane of the ring and coaxial therewith, the shaft being provided with a springing arm which extends from the shaft toward the ring periphery and presses the tape against the ring. This springing arm may have a foot or tape contactor which touches the tape and has a relatively high coefficient of friction against the tape, or even positive means for fastening to the tape end so that the tape is forced to coil within the ring as the shaft is rotated.

A second ring is disposed within the first ring and serves to guide the tape as it is being wound into the first ring. The outer periphery of the second ring is smooth so as to offer minimum friction to the innermost coil of tape as the tape is slid around the interior peripheral surface of the first ring.

The shaft may be permanently mounted within the ring, but preferably is fastened in a separate detachable frame or housing from which the ring may be removed after the tape is wound. In this fashion rolls of tape are stored simply and with a minimum of excess structure, so that the inertia of the rolls is about as low as possible.

These and other aspects of the invention will be clearly understood from the following detailed description taken in conjunction with the accompanying drawings in which.

Figure 1:
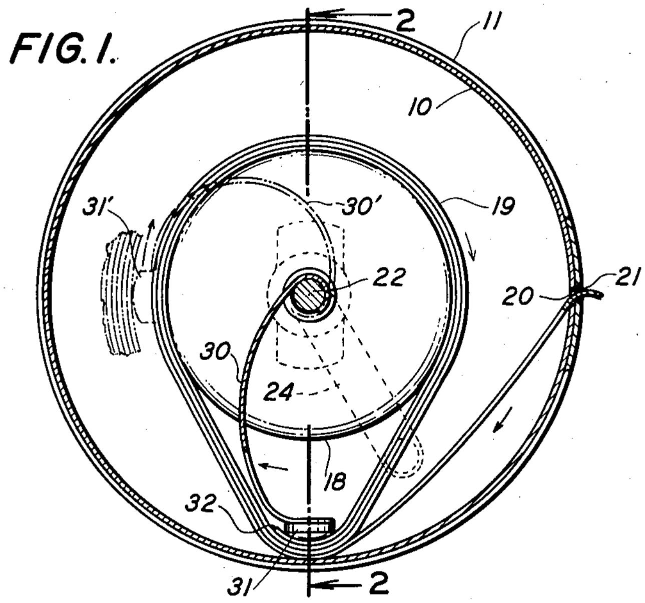
Fig. 1 is a sectional elevation of a preferred embodiment of the invention.
Figure 2:
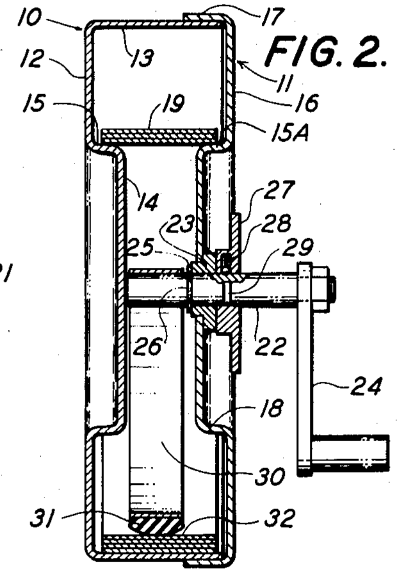
Fig. 2 is a sectional elevation taken on line 2—2 of Fig. 1.

The structure shown in Figs. 1 and 2 comprises a tape container 10 over which is disposed a winding frame 11. The tape container is an open, shallow cylinder, having an end wall 12 and a peripheral wall 13 which is a ring with a smooth interior surface extending at right angles to the closed end wall. A first circular projection 14 extends from the end wall coaxially into the tape container, forming a second ring surface 15 within the tape container. Conveniently, the container is made of thin sheet metal and the projection is formed integrally with the end wall by a stamping operation.

The winding frame is also a shallow cylinder, having an end wall 16 and a peripheral wall 17 opened at one end so that it can be slid over the tape container. The winding frame is held on the outside of the tape container ring by friction. A second circular projection 18 is formed coaxially in the end wall so that it extends into the tape container when the winding frame is slid over the container, and provides a third ring surface 15A within the tape container. The respective circular projections of the tape container and winding frame are of the same diameter and are in alignment when the winding frame is slipped over the tape container. The respective inner edges of the circular projections are spaced apart by a distance slightly less than the width of a tape 19 which is shown in Fig. 2 as being wound into the container.

Both the tape container and the winding frame have respective matching slots 20, 21 in their peripheral walls for the passage of the tape during either a winding or unwinding operation. These slots extend perpendicular to the end walls of the tape container and winding frame.

A rotatable shaft 22 is detachably journaled through a bushing 23 in the end wall of the winding frame and extends coaxially into the tape container. The shaft may be driven by any conventional means; for example, by a crank 24 positioned on the end of the shaft exterior to the tape container. The shaft is held in the bushing by means of a C-washer 25 disposed in a first annular groove 26 in the intermediate portion of the shaft and a retaining washer 27 having a spring-loaded detent 28 which engages in a second annular groove 29 in the shaft spaced from the first groove by a distance slightly greater than the length of the bushing and in the direction of the crank. The crank is detachably mounted to the shaft so the retaining washer and the winding frame can be slipped on and off the tape container without movement of the shaft.

One end of a cantilever leaf spring 30 is fastened to the end of the shaft within the tape container so that the spring extends transversely to the shaft. A friction pad 31 for pressing the tape against the peripheral wall of the tape container is fastened to the other end of the cantilever spring. The spring tends to hold the tape contactor out against the peripheral wall of the tape container. Preferably, the tape contactor is a friction pad made of a material which has a high coefficient of friction against the tape. For example, soft rubber may be used. Additional friction between the pad and tape can be provided if required by coating the paid with any suitable adhesive material (not shown).

The operation of the assembled device of Figs. 1 and 2 is as follows: An end 32 of the tape is manually slipped into the tape container through the matching slits in the peripheral walls of the tape container and the winding frame. The shaft is rotated so that the tape contactor slides around the inner peripheral wall of the tape container and engages with the tape so that the paper tape is squeezed between the interior surface of the tape container and the tape contactor. The coefficient of friction between the tape contactor and the paper is much higher than that between the paper and the interior peripheral surface of the tape container. As the tape contactor is rotated by operation of the crank, the paper is carried around the interior peripheral surface of the tape container and stored in a tight spiral. The ring surfaces 15, 15A within the tape container serve to guide the interior portion of the tape as it is being wound and prevent the tape from binding around the winding shaft. Operation of the crank is continued until the desired quantity of tape is stored within the housing. The position of the spring 30′ and the contact pad 31′ when the container is almost full of tape is shown in phantom line in Fig. 1.

The tape can be used as stored without any further handling, but the presence of the winding means within the wound tape impedes rapid withdrawal of the tape and also contributes to the inertia of the storage system. Therefore, it is desirable to remove the winding means from the stored tape prior to its subsequent use.

The winding frame may be slipped off the tape container and thereby pull the winding means from within the wound tape. However, in this operation there is a tendency for the tape contactor to pull the tape out of the container also, and this is desirably avoided by first removing the crank handle and retaining washer from the winding shaft. The winding frame is then slipped off the tape container without disturbing the shaft, spring, or tape contactor. With the frame removed, the spring is easily compressed and the shaft, spring and contactor removed manually without disturbing the tape.

The winding frame with its winding means removed is then replaced on the tape container. It is convenient, when a plurality of tape containers are required, to have a tape container cover for each container so that the winding frame may be used on all the containers. The tape container cover (not shown) can be of the same general construction as the winding frame except that it is not provided with the winding means.

With the tape stored in the above described manner, its periphery is completely protected, and it is also available for withdrawal at any desired speed with a minimum amount of inertia. The above type of winding also has the advantage that if for any reason the tape feeding into the housing during winding becomes jammed, the friction pad will simply slip around the innermost surface of the stored tape and not tear the tape.

Figures 3, 4, 5:
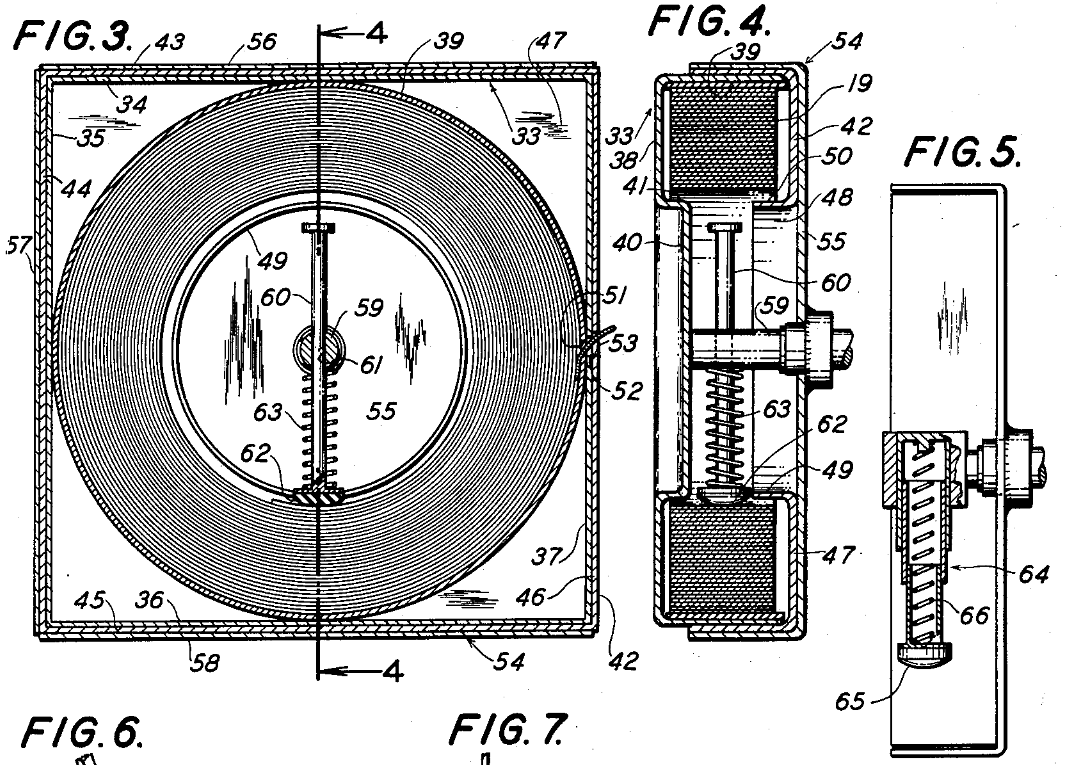
Fig. 3 is a sectional elevation of another embodiment of the winding mechanism for use in the invention.
Fig. 4 is a sectional elevation taken on line 4—4 of Fig. 3.
Fig. 5 is an elevation of another embodiment of the winding mechanism which can be used in the invention.

Figs. 3 and 4 illustrates another embodiment of the invention. The tape container 33 comprises a shallow, square box having four side walls 34, 35, 36, 37 and an end wall 38. A first ring 39 having a diameter equal to the length of the side walls is disposed within the box and rigidly attached to the end wall. The interior peripheral surface of the ring is smooth and its width is approximately equal to the height of the side walls, which is slightly greater than the width of the tape being stored. A circular projection 40 is stamped in the end wall of the tape container to form an inner ring surface 41 within the tape container.

A tape container cover 42 in the shape of a shallow, square box having four side walls 43, 44, 45, 46 and an end wall 47 is adapted to slip over the container. The cover is held in place by the friction between the side walls of the cover and the container. A hole 48 having the same diameter as the circular projection in the tape container end wall is stamped in the end wall of the tape container cover so that a lip 49 is formed around the hole and extends coaxially into the container to provide an inner ring surface 50. When the cover is on the container the respective inner edges of the two inner ring surfaces 41, 50 are spaced apart at a distance slightly less than the width of the tape.

Matching slots 51, 52, 53 are provided in the side walls of the first ring, the tape conatiner and the cover for the passage of the tape.

A winding frame 54 in the shape of a shallow, square box is adapted to slip over the tape container cover and the tape container. The winding frame has an end wall 55 and only three side walls 56, 57, 58 to facilitate its assembly and disassembly from the container and the cover. A rotatable shaft 59 is journaled through the end wall of the winding frame and one end of the shaft extends coaxially into the tape container when the frame is placed in winding position. A movable plunger 60 is mounted through a bore 61 extending transversely through the end of the shaft within the tape container. A tape contacting pad 62 is provided at one end of the plunger, and a helical spring 63 is disposed around the plunger between the tape contactor and the rotatable shaft for forcing the tape contactor out against the inner periphery of the first ring.

The operation of the device of Figs. 3 and 4 is similar to that of the device of Figs. 1 and 2, except that the cover for the device of Figs. 3 and 4 is placed into position prior to the winding of the tape. Also, the winding frame and the winding means are easily removed from the wound tape. The plunger is oriented so that the end with the tape contactor is closest to the side wall of the winding frame which does not have an opposite side wall. The frame is then tilted so the plunger can pass through the opening in the container cover and then be slipped off the cover.

Fig. 5 shows an alternate method for forcing the tape contactor out against the interior peripheral surface of the tape container. The contactor is mounted on a hollow, telescoping plunger 64. One end of the plunger is mounted on the rotatable shaft so that the plunger extends transverse to the axis of shaft rotation. A tape contactor 65 is attached to the other end of the plunger. A spring 66 is positioned within the plunger for forcing the tape contactor out against the interior peripheral surface of the tape container. The operation of this device is the same as that described for the device of Figs. 2, 3 and 4.

Figure 6:
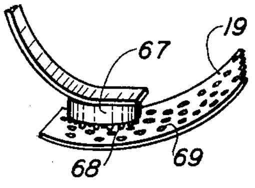
Fig. 6 is a fragmentary perspective of a modification of the tape contacting element.
Figure 7:
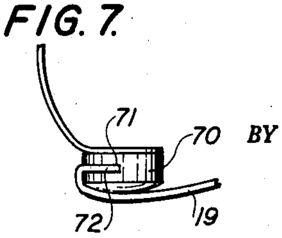
Fig. 7 is a fragmentary elevation of another modification of the tape contacting element.

In those applications where there is little danger that the tape will "bind" during the winding operation, the tape can be attached to the tape contactor by more positive means than friction alone. For example, referring to Fig. 6, a tape contactor 67 is provided with projections 68 which fit into perforations 69 provided in the tape 19; or, as shown in Fig. 7, a tape contactor 70 slit at 71 along its leading edge to receive the leading end 72 of the tape and hold the tape firmly as the winding operation is performed.

I claim:

1. In a mechanism for storing tape, the combination which comprises a first ring having a smooth interior surface and an opening in its wall for the passage of tape, a member disposed within the first ring and rotatable on its axis, springing means fastened to the rotatable member and extending outwardly and pushing toward the smooth interior surface of the first ring for holding the tape between the outer end of the springing means and the smooth surface so that the tape is wound within the ring as the member is rotated, and a second smaller ring fastened within the first ring and substantially coaxial with it and extending partly across the first ring but clear of the path of the springing means.

2. Apparatus according to claim 1 in which the springing means comprises a movable plunger disposed through a transverse bore in the rotatable member, and a compression spring mounted on the plunger between the rotatable member and one end of the plunger, the spring tending to hold the said end of the plunger against the interior surface of the first ring.

3. Apparatus according to claim 1 in which the springing means comprises a hollow telescoping plunger with the end of the plunger attached to the rotatable member so the plunger extends transverse to the axis of rotation of the member, and a compression spring disposed within the plunger tending to hold the plunger in an extended position.

4. In a mechanism for storing tape, the combination which comprises a first ring having a smooth interior surface and an opening in its wall for the passage of tape, a member disposed within the first ring and rotatable on its axis, a frame adapted to fit on the first ring and detachably support the rotatable member, springing means fastened to the rotatable member and extending outwardly and pushing toward the smooth interior surface of the first ring for holding the tape between the outer end of the spring means and the smooth surface so that it is wound within the ring as the member is rotated, and a second smaller ring fastened within the first ring and substantially coaxial with it and extending partly across the first ring but clear of the path of the springing means.

5. In a mechanism for storing tape, the combination which comprises a first ring having a smooth interior surface and an opening in its wall for the passage of tape, a member disposed within the first ring and rotatable on its axis, outwardly extending springing means fastened to the rotatable member, a tape contactor fastened to the outward end of the springing means whereby the tape contactor is extended and pushed toward the smooth interior surface of the first ring for holding the tape against that smooth surface so that the tape is wound within the ring as the member is rotated, the coefficient of friction between the tape and the contactor being higher than between the tape and the interior surface of the first ring, and a second smaller ring fastened within the first ring and substantially coaxial with it and extending partly across the first ring but clear of the path of the springing means.

6. In a mechanism for storing perforated tape, the combination which comprises a first ring having a smooth interior surface and an opening in its wall for the passage of tape, a member disposed within the first ring and rotatable on its axis, an outwardly extending springing means fastened to the rotatable member, a tape contactor having a plurality of projections fastened to the outward end of the springing means whereby the tape contactor is pushed toward the smooth interior surface of the first ring so that the projections engage in the tape perforations and the tape is wound within the ring as the member is rotated, and a second smaller ring fastened within the first ring and substantially coaxial with it and extending partly across the first ring, but clear of the path of the springing means.

7. In a mechanism for storing tape, the combination which comprises a first ring having a smooth interior surface and an opening in its wall for the passage of tape, a member disposed within the first ring and rotatable on its axis, an outwardly extending springing means fastened to the rotatable member, a tape contactor having a slit for gripping one end of the tape fastened to the outward end of the springing means whereby the tape contactor is pushed toward the smooth interior surface of the first ring so that the tape is held against that smooth surface and wound within the ring as the member is rotated, and a second smaller ring fastened within the first ring and substantially coaxial with it and extending partly across the first ring but clear of the path of the springing means.

References Cited in the file of this patent

UNITED STATES PATENTS

| | | |
|---|---|---|
| 2,311,383 | Hardenberg | Feb. 16, 1943 |
| 2,616,633 | Reynolds | Nov. 4, 1952 |
| 2,616,634 | Melkon | Nov. 4, 1952 |